(12) United States Patent
Sevastianov et al.

(10) Patent No.: US 7,542,038 B2
(45) Date of Patent: Jun. 2, 2009

(54) METHOD AND SYSTEM FOR PIVOT-POINT BASED ADAPTIVE SOFT SHADOW ESTIMATION

(75) Inventors: Igor Sevastianov, Nizhny Novgorod (RU); Alexei M. Soupikov, Nizhny Novgorod (RU); Yuri Moiseenko, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 11/171,749

(22) Filed: Jun. 30, 2005

(65) Prior Publication Data

US 2007/0003133 A1 Jan. 4, 2007

(51) Int. Cl.
*G06T 15/50* (2006.01)
(52) U.S. Cl. .................................................... 345/426
(58) Field of Classification Search ........................ None
See application file for complete search history.

(56) References Cited

U.S. PATENT DOCUMENTS

| | | | | |
|---|---|---|---|---|
| 5,299,298 A * | 3/1994 | Elmquist et al. | ............ | 345/421 |
| 5,313,568 A * | 5/1994 | Wallace et al. | ............. | 345/426 |
| 5,546,515 A * | 8/1996 | Mochizuki | ................. | 345/606 |
| 5,613,048 A * | 3/1997 | Chen et al. | .................. | 345/419 |
| 6,252,608 B1 * | 6/2001 | Snyder et al. | ............... | 345/473 |
| 6,496,597 B1 * | 12/2002 | Tampieri | .................... | 382/154 |
| 6,850,209 B2 * | 2/2005 | Mankins et al. | ............. | 345/1.3 |
| 7,015,908 B2 * | 3/2006 | Nakagawa et al. | ......... | 345/426 |
| 7,256,796 B1 * | 8/2007 | Bastos et al. | ................ | 345/614 |
| 7,301,538 B2 * | 11/2007 | Buyanovskiy | .............. | 345/426 |
| 7,385,604 B1 * | 6/2008 | Bastos | ........................ | 345/426 |
| 7,423,645 B2 * | 9/2008 | Dougherty et al. | .......... | 345/426 |
| 2007/0159478 A1 * | 7/2007 | Choi et al. | .................. | 345/426 |

OTHER PUBLICATIONS

Debelov et al. Light Mesh: Soft Shadows as Interpolation of Visibility. Future Generation Computer Systems. vol. 20. Issue 8. Nov. 2004.*
Develov et al. Light Meshes—Original Approach to Produce Soft Shadows in Ray Tracing. Proceedings of the International Conference on Computational Science—Part II. 2002.*
Parker et al. Single Sample Soft Shadows. 1998.*
Jensen et al. Efficiently Rendering Shadows Using the Photon Map. Proceedings of Compugraphics '95. Dec. 1995.*
Lischinski et al. Bounds and Error Estimates for Radiosity. Proceedings of the 21st Annual Conference on Computer Graphics and Interactive Techniques. 1994.*
Wallace et al. A Ray Tracing Algorithm for Progressive Radiosity. ACM SIGGRAPH Computer Graphics. vol. 23. Issue 3. Jul. 1989.*
Foley et al. Computer Graphics: Principles and Practice. Addison-Wesley Pub. Co. 1997. pp. 800-804.*

* cited by examiner

*Primary Examiner*—Peter-Anthony Pappas
(74) *Attorney, Agent, or Firm*—Buckley, Maschoff & Talwalkar LLC

(57) ABSTRACT

An apparatus and method for soft shadow calculations, the method including dividing an area light source into a patch of points, obtaining a packet of points on a surface that is subject to illumination by the patch of points, determining a form-factor value for each of the points in the packet of points; and simultaneously performing adaptive soft shadow calculations for each of the points in the packet based on the point in the packet having the greatest form-factor.

17 Claims, 5 Drawing Sheets

METHOD AND SYSTEM FOR PIVOT-POINT BASED ADAPTIVE SOFT SHADOW ESTIMATION

BACKGROUND

In computer-generated three-dimensional (3-D) environments it may be important to provide properly represented light sources, soft shadows, refractions and/or reflections in order to provide photo-realistic renderings of images. It may also be desirable to have the images rendered in "real-time". Real-time photo-realistic renderings may contribute to a better viewing experience of, for example, video playback and game play.

However, a number of techniques, methods, and systems for rendering 3-D graphics may not render images in real-time. Limitations of such techniques, methods, and systems may be due to, at least in part, the processing power and access speed of a graphics rendering device, an availability and access speed to a memory device, and the complexity and enormity of the processing calculations required to render the 3-D graphics. In some instances, a comprise may be reached between the amount of data processed and rendering speed of the graphics. For example, the resolution of a rendered 3-D graphics image may be reduced in an attempt to complete the rendering process faster.

Thus, a need for an efficient method and system of processing 3-D images exists.

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

Figure 1:
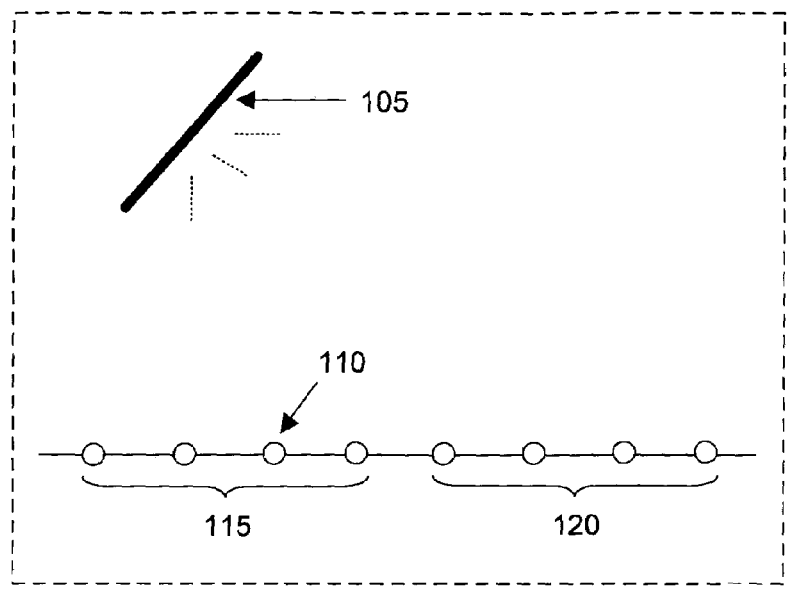
FIG. 1 is an exemplary illustration of a representative scene, in accordance with some embodiments herein.

FIG. 1 is an exemplary representation of an area light source 105 and a surface 110 that may be illuminated by area light source 105. Specific areas or points 115 may be illuminated by area light source 105.

Regarding the rendering of 3-D images, realistic shadowing may provide depth and perspective to an image and contribute towards properly representing the image. A number of methods and techniques may be used to obtain shadow representations cast by the interaction of a light source and objects in a viewed scene. One such method includes an adaptive method for calculating an illumination at a point that is illuminated by an area light source. An accurate determination of shadows may be performed using the determined illumination at the surface point due to the area light source.

Figure 2:
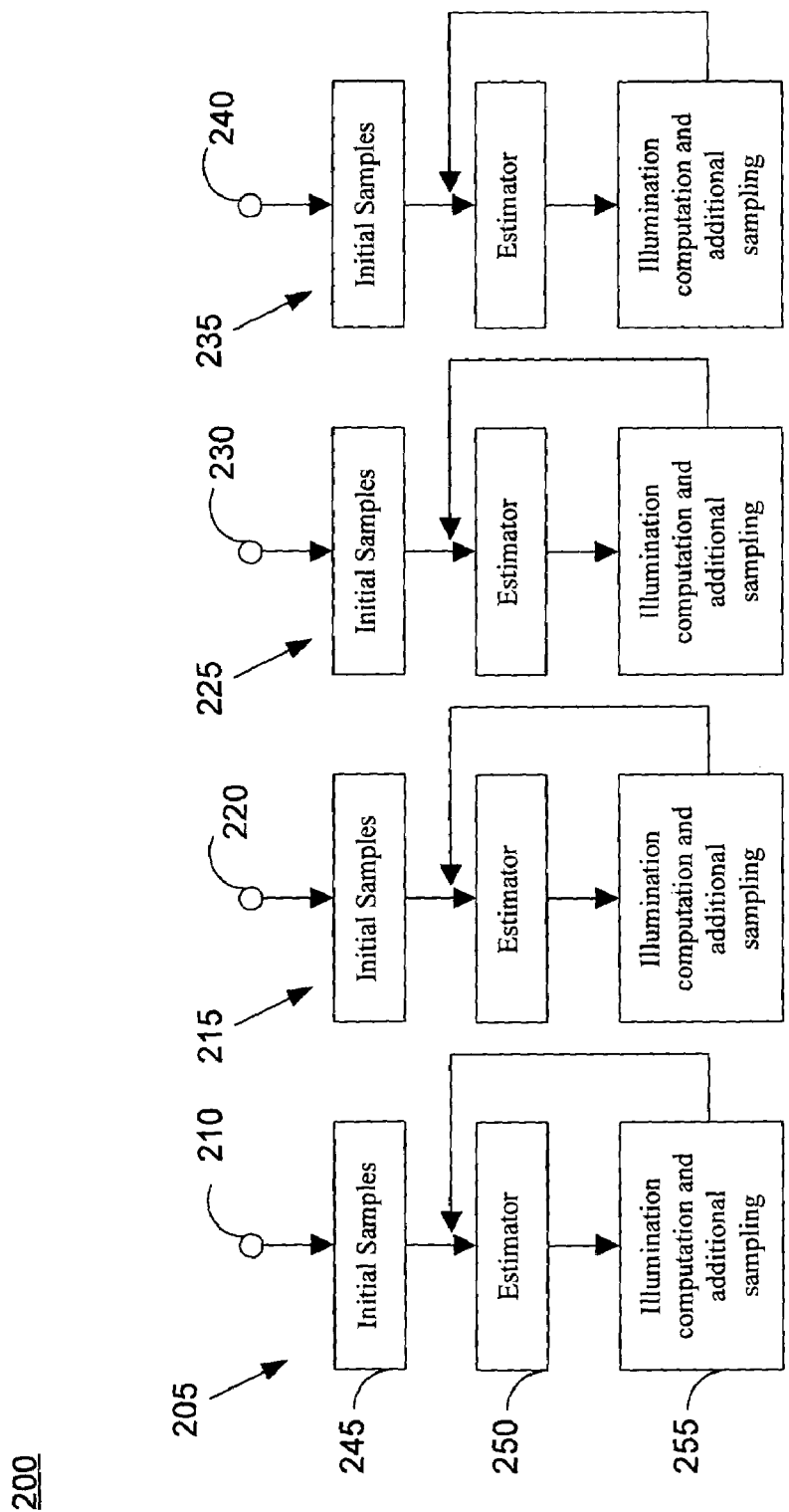
FIG. 2 is a block diagram representation of a method.

In general, an adaptive method 200 for computation of illumination at a point from an area light source may be obtained by a process depicted in FIG. 2. Points 210, 220, 230, and 240 represent points on a surface of an object illuminated by the area light source. For each surface points 210, 220, 230, and 240, a number of initial sample points on an area light source are selected. The area light samples may correspond to rays from the area light source.

Using ray tracing techniques, rays are drawn between each of the illuminated surface points 210, 220, 230, and 240 and the selected samples of the area light source. Ray tracing, in general, is the process of tracing the trajectory of a ray from one point (e.g., a surface point being illuminated) to another point (e.g., a point on the area light source). Ray tracing is performed between each of the surface points 210, 220, 230, 240 and an initial sampling of points on the area light source at operation 245. The ray tracing operations herein are used as a tool in the larger process of illumination calculation and shadow determination.

Based on initial samples (e.g., pixels) of the area light source, an estimator 250 is used to determine which regions of the area light source, if any, require additional samples and which regions of the area light source are estimated with a requisite precision. Estimator 250 may use the previous samples of the area light source to determine where and how many additional calculations are needed to improve a visibility/illuminating estimation. Additional samplings may be obtained for areas of light needing additional precision.

At operation 255, illumination computations are performed for the sufficiently sampled regions of the area light source, and additional sampling operations are performed for those regions of the area light source determined to need further precision. The estimating and additional sampling may occur recursively, as indicated by the loop-back arrow, until satisfactory samples of the area light source are obtained.

The determined illumination calculations may be used to ascertain shadowing for a rendered scene. It is noted that for the method depicted in FIG. 2, area light source subdivision, sampling of the area light source, and estimation of illumination is separately performed for each surface points 210, 220, 230, and 240. This is illustrated in FIG. 2 by the four separate process flows, one for each surface point 210, 220, 230, and 240.

Figure 3:
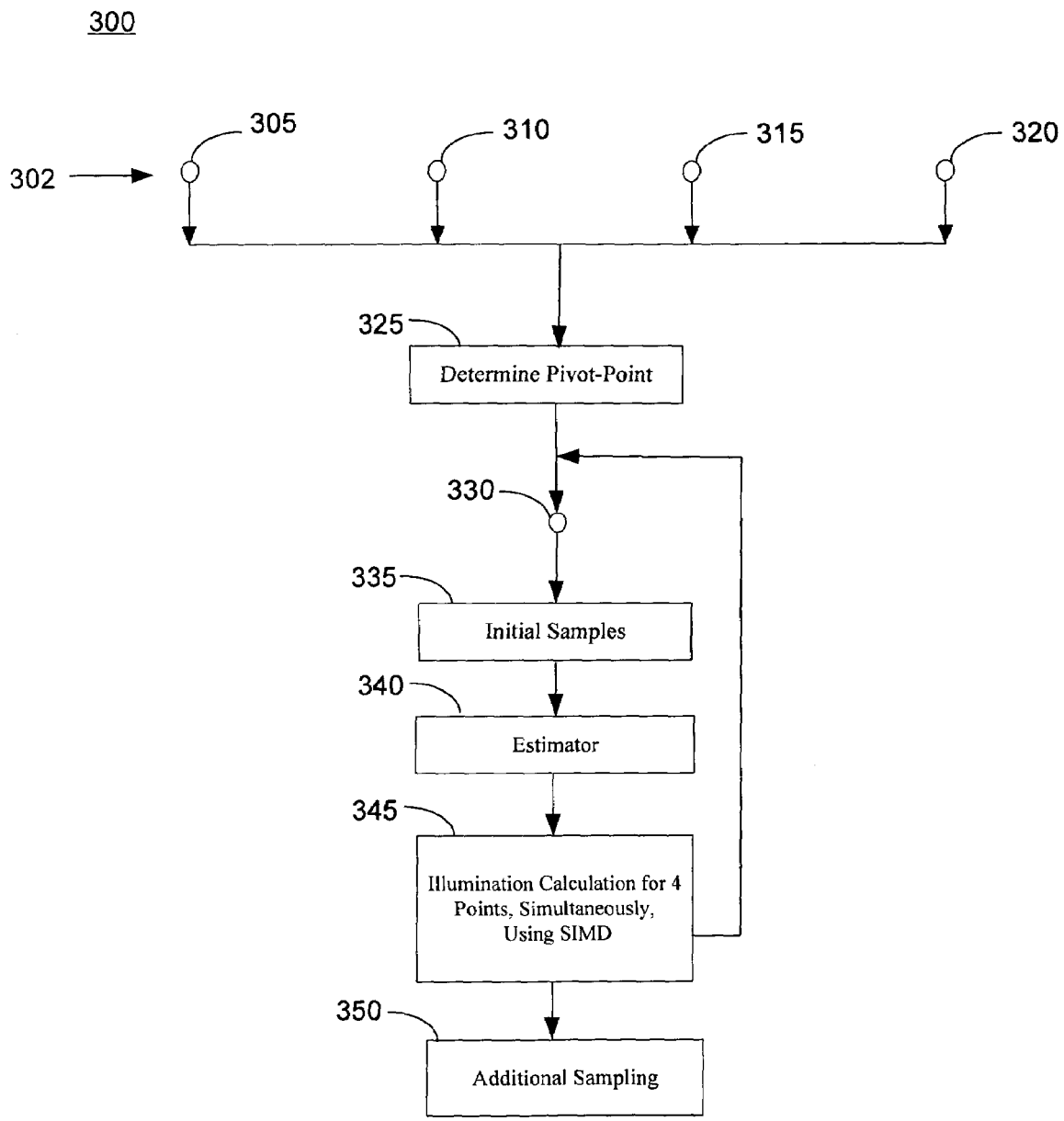
FIG. 3 is a block diagram representation of a method, in accordance with some embodiments herein.

In some embodiments herein, FIG. 3 is an exemplary method or process 300 to accelerate soft shadow calculations using an adaptive method for efficiently computing illumination at a point subject to illumination by a light source. A set or vector of points on an illuminated surface may be grouped together in a set of points and referred to herein as a packet of points. In some embodiments, the number of points included in a packet of points may be a fixed predetermined number of points or may vary. FIG. 1 illustrates two packets of points, packet of points 115 and packet of points 120. Each packet of points 115 and 120 contains four (4) points. FIG. 3 presents a packet of points 302 comprising points 305, 310, 315, and 320.

For each point 305, 310, 315, and 320, a form-factor is determined for the point relative to the area light source at operation 325. The form-factor is indicative of the fraction of light that leaves one point and arrives at another point. Thus, the form-factor for each of the surface points 305, 310, 315, 320 relative to the area light source provides an indication of the fraction of energy that leaves the area light source and arrives at the surface point.

Based on the form-factor determined for each of the surface points 305, 310, 315, and 320 in packet 302, a pivot-point 330 is determined for the packet of points. In some embodiments, the pivot-point is the surface point in the packet of points having the largest form-factor. Process 300 may use pivot-point 330 for further operations related to the adaptive calculations, estimations, and samplings thereof. Since the form-factor is determined to be the surface point having the largest (i.e., maximum) form-factor, calculations based on the pivot-point may provide that sufficient results for correct illumination for all of the points in the packet.

Using ray tracing techniques, rays are traced between the points and the selected samples of the area light source. In some embodiments, a ray tracer (e.g., a ray tracing engine) may process a block of rays or pixels simultaneously. In some embodiments, a patch of points for the area light source includes four points and a ray tracer herein may process four(4) such patches at a time. Thus, the ray tracer may process 16 rays of pixels simultaneously.

Figure 4:
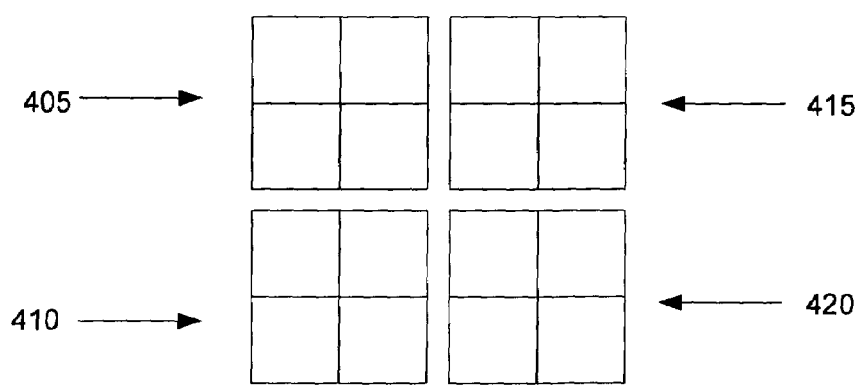
FIG. 4 is an exemplary depiction of a packet of points, according to some embodiments hereof.

FIG. 4 is a depiction of a 4×4 block 400 of display pixels used in an exemplary ray tracing, in accordance with some embodiments herein. Blocks 405, 410, 415, and 420 each comprise four(4) pixels and combine to provide 16 pixels for block 400. Rays may be created by taking the 4×4 block of pixels 400 from a display device screen. When the block of rays impact a surface in a scene, 16 discrete hit points will result. Illumination calculations are performed for the 16 discrete hit points using ray tracing techniques. After the lighting computation due to the initial hit points, an additional 16 hit points are obtained based on the reflected and refracted bounce of the 16 rays from the 16 hit points. Lighting computations are determined for the 16 discrete hits due to reflections and refractions. This process of repeated lighting computations based on reflections and refractions is continued to accumulate result colors for the surfaces hit by the rays.

Using pivot-point 330, the adaptive operations of process 300 are performed. An initial sampling (e.g., pixels) of the area light source is conducted at operation 335. Estimator 340 determines which regions of the area light source, if any, require additional samples and which regions of the area light source are estimated with a requisite precision. The estimation may be done to determine if more samples are needed for a more adequate estimation of illumination and to determine a preferred direction from where the samples are taken.

In an instance it is determined that the area light source is adequately sampled, operation 345 simultaneously provides an illumination calculation for the points (e.g., 305, 310, 315, 320) in the packet. Since the subdivision calculations and samples placement is performed using one point, pivot-point 330, the illumination calculation for all of the points in the packet 302 may be performed simultaneously since the pivot-point having the maximum form factor value is sufficient for all adaptive subdivisions and samples placements. The simultaneous calculations may be implemented, in some embodiments, using single instructions multiple data (SIMD) instructions.

In some embodiments herein, a ray tracer may be implemented using SIMD instructions. The illumination calculations may be performed for four points comprising a packet, simultaneously. In some embodiments, four packets may be processed simultaneously as implemented in SIMD instructions. Thus, calculation for a total of 16 (4×4) rays may be done simultaneously.

Further, additional samplings may be performed, if determined as necessary, based on the pivot-point.

It is noted that the subdivision of the area light, sampling of the area light source, and estimation operations are performed relative to the pivot-point in process 300. This is in contrast to the four separate process flows of process 200. Process 300 may therefore provide a methodology that is efficient and/or faster since fewer calculations are needed to calculate illuminations for a scene.

Figure 5:
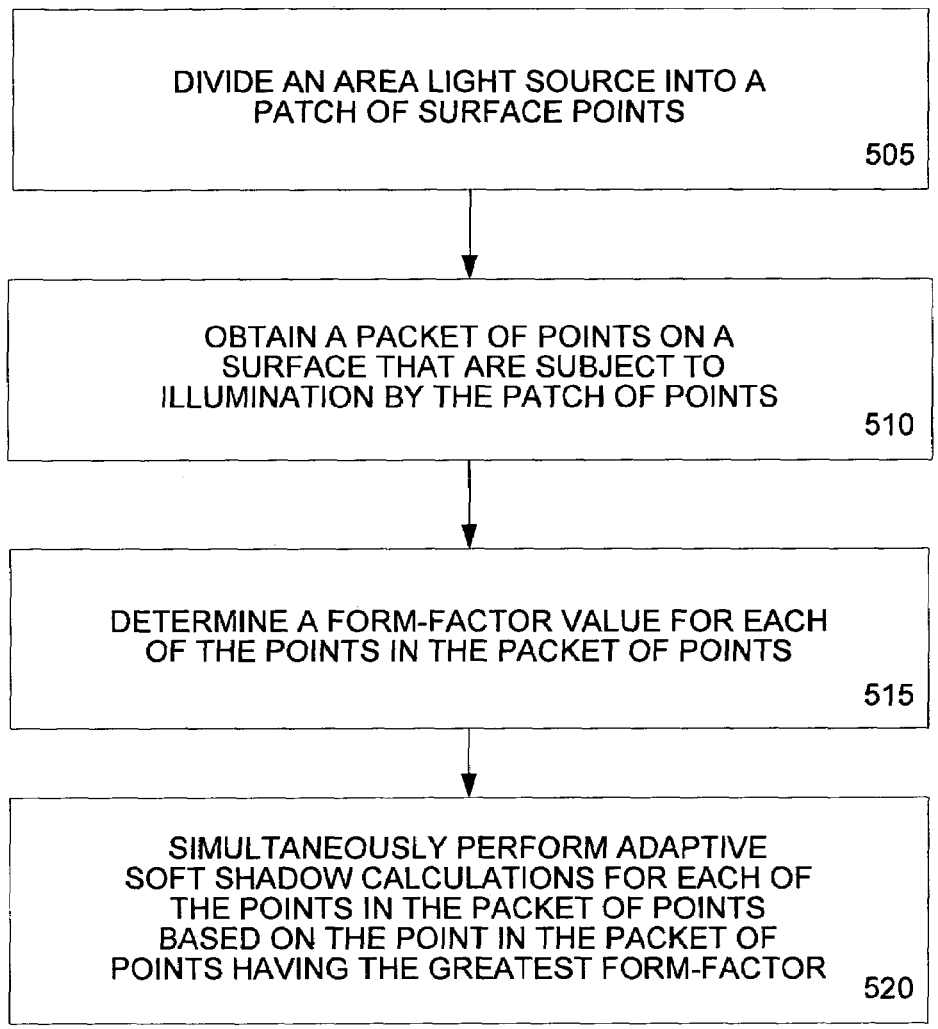
FIG. 5 is an exemplary flow diagram of a method, according to some embodiments hereof.

FIG. 5 is an exemplary flow diagram for a method 500, in accordance with some embodiments herein. At operation 505, an area light source is divided into a patch of points. The patches may comprise a 4×4 block of pixels that provide rays of light for a graphics scene. At operation 510, a number of points on a surface illuminated by the area light source are obtained. Any number or variety of methods and techniques may be used to determine the surface points to provide for process 500. The number of surface points may be grouped and referred to as a packet.

At operation 515, a form-factor for each of the points in the packet is determined. At operation 520, an adaptive method soft shadowing calculations are performed for the surface points in the packet based on the point in the packet having the greatest (i.e., maximum) form-factor. The surface point with the maximum form-factor of the packet is termed the pivot-point. Further adaptive calculations are performed using the pivot-point. Since the pivot-point has the largest form-factor, illumination calculations performed using the pivot-point are sufficient for all of the surface points in the packet.

Furthermore, since the calculations for all of the points (e.g., 4) in the packet are performed simultaneously, efficiencies may be provided by process 500. The simultaneous calculations herein may be implemented as SIMD instructions executable by a computer, system, or device having functionality to process SIMD instructions.

Figure 6:
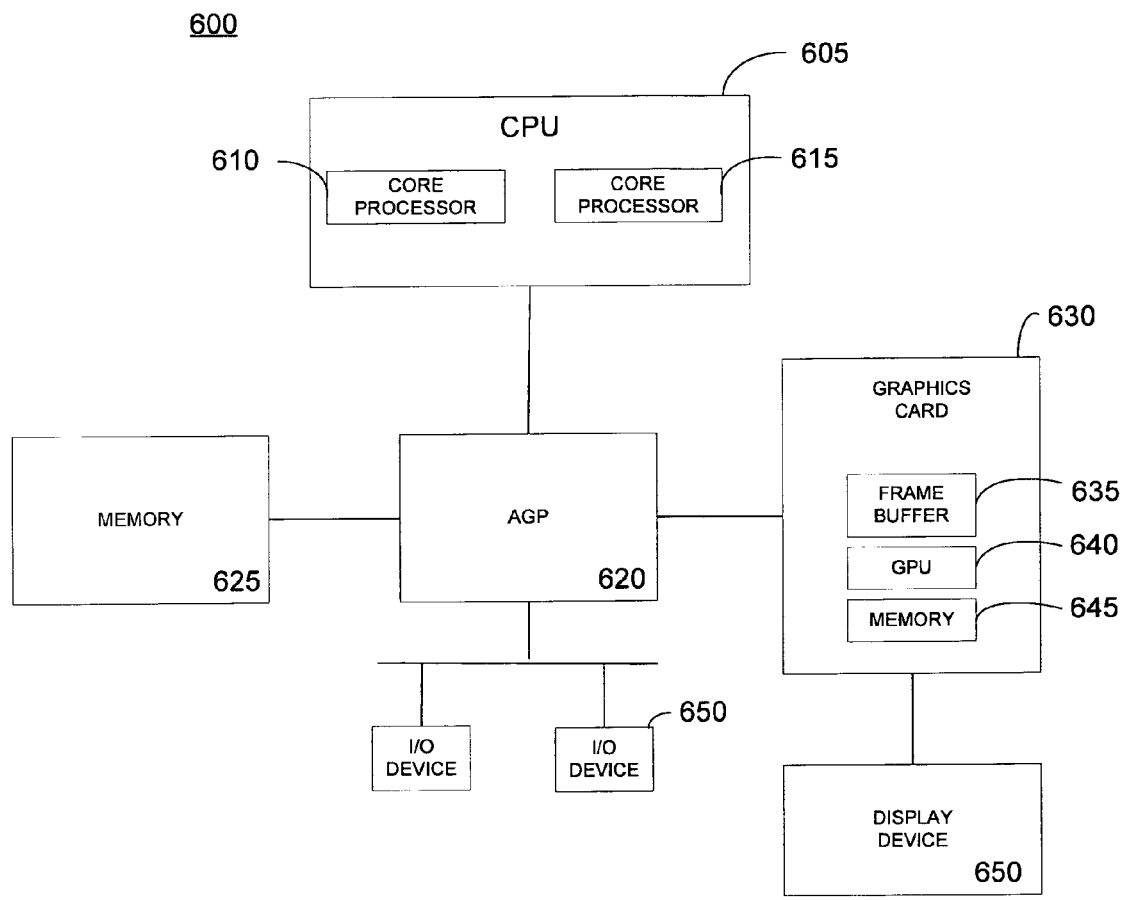
FIG. 6 is a block diagram of an exemplary system, according to some embodiments hereof.

FIG. 6 is a block diagram of a system 600, in accordance with some embodiments herein. System 600 may include a CPU 605. CPU 605 may include two or more core processors 610 and 615 to simultaneously execute SIMD instructions. Core processors 610, 615 may have on-chip cache (not shown) associated therewith.

CPU 605 is connected to an AGP 620. AGP 620 may provide a point-to-point connection between CPU 605, system memory 625, and graphics card 630. AGP 620 may further connect CPU 605, system memory RAM 625, and graphics card 630 to other input/output (I/O) devices 650. The other I/O devices may include, for example, a hard disk drive, magnetic disk drive, network card, and/or peripheral devices (not shown).

Graphics card 630 may comprise a frame buffer 635 that connects to the display device 650. As known and appreciated by those of skill in the art, frame buffer 635 is typically dual-ported memory that allows a processor (e.g., a graphics processing unit, GPU 640, or a CPU, not shown) to write a new or revised image to the frame buffer while display device 640 simultaneously reads from frame buffer 635 to refresh a current display content.

GPU 640 may be a second processing unit in computer system 600 that is specifically optimized for graphics operations. GPU 640 may be either a graphics coprocessor or a graphics accelerator.

Accompanying GPU 640 may be a memory 645. Memory 645 may be DRAM (dynamic random access memory), DDR-SDRAM (double data rate-synchronous random access memory), and other forms of memory storage devices. Memory 645 may provide storage for GPU 640 to maintain its own shadow memory for speedy memory calls, instead of using system memory 625.

System memory 625 may comprise an operating system, video drivers, and other memory allocations, applications, and programs. In some embodiments, program instructions that when executed implement some methods herein may be stored in memory 625. Also, some, part, or all of the program instructions to implement some of the methods herein may be embodied on a memory device that is removably connected to system 600.

The foregoing disclosure has been described with reference to specific exemplary embodiments thereof. It will, however, be evident that various modifications and changes may be made thereto without departing from the broader spirit and scope set forth in the appended claims.

What is claimed is:

1. A method to determine soft shadows, the method comprising:
    dividing an area light source into a patch of points;
    obtaining a packet of points on a surface that is subject to illumination by the patch of points;
    determining a form-factor value for each of the points in the packet of points; and
    simultaneously performing adaptive soft shadow calculations by a processor for each of the points in the packet using the point in the packet having the greatest form-factor value for the adaptive soft shadow calculation for each of the points in the packet, wherein the form-factor value is an indication of the fraction of energy from the patch of light that arrives at the points in the packet of points.

2. The method of claim 1, wherein the point in the packet of points having the greatest form-factor value is a pivot-point for the packet of points.

3. The method of claim 1, wherein the area light source is divided into the patch of points based on an initial illumination threshold.

4. The method of claim 1, wherein the simultaneous performing of the adaptive method soft shadow calculations is implemented in single instruction multiple data (SIMD) processor executable instructions.

5. The method of claim 4, wherein at least a portion of the simultaneous performing of the adaptive method soft shadow calculations is performed by a multi-core processor.

6. An apparatus comprising:
    a memory storing processor executable instructions; and
    a processor in communication with the memory and operative in conjunction with the stored instructions to:
        divide an area light source into a patch of points;
        obtain a packet of points on a surface that is subject to illumination by the patch of points;
        determine a form-factor value for each of the points in the packet of points; and
        simultaneously perform adaptive soft shadow calculations for each of the points in the packet using the point in the packet having the greatest form-factor value for the adaptive soft shadow calculation for each of the points in the packet, wherein the form-factor value is an indication of the fraction of enemy from the patch of light that arrives at the points in the packet of points.

7. The apparatus of claim 6, wherein the point in the packet of points having the greatest form-factor value is a pivot-point for the packet of points.

8. The apparatus of claim 6, wherein the area light source is divided into the patch of points based on an initial illumination threshold.

9. The apparatus of claim 6, wherein the simultaneous performing of the adaptive method soft shadow calculations is implemented in single instruction multiple data (SIMD) processor executable instructions.

10. The apparatus of claim 6, wherein the processor is a multi-core processor having at least two core processors.

11. A storage medium having executable programming instructions stored thereon, the stored program instructions comprising:
    instructions to divide an area light source into a patch of points;
    instructions to obtain a packet of points on a surface that is subject to illumination by the patch of points;
    instructions to determine a form-factor value for each of the points in the packet of points; and
    instructions to simultaneously perform adaptive soft shadow calculations for each of the points in the packet using the point in the packet having the greatest form-factor value for the adaptive soft shadow calculation for each of the points in the packet, wherein the form-factor value is an indication of the fraction of energy from the patch of light that arrives at the points in the packet of points.

12. The medium of claim 11, wherein the point in the packet of points having the greatest form-factor value is a pivot-point for the packet of points.

13. The medium of claim 11, further comprising instructions to divide the area light source into the patch of points based on an initial illumination threshold.

14. The medium of claim 11, wherein at least the instructions for simultaneous performing of the adaptive method soft shadow calculations is implemented in single instruction multiple data (SIMD) processor executable instructions.

15. A system comprising:
    a double data rate memory storing processor executable single instruction multiple data (SIMD) instructions; and
    a multi-core processor in communication with the memory and operative in conjunction with the stored SIMD instructions to:
        divide an area light source into a patch of points;
        obtain a packet of points on a surface that is subject to illumination by the patch of points;
        determine a form-factor value for each of the points in the packet of points; and
        simultaneously perform adaptive soft shadow calculations for each of the points in the packet using the point in the packet having the greatest form-factor value for the adaptive soft shadow calculation for each of the points in the packet, wherein the form-factor value is an indication of the fraction of energy from the patch of light that arrives at the points in the packet of points.

16. The system of claim 15, wherein the point in the packet of points having the greatest form-factor value is a pivot-point for the packet of points.

17. The system of claim 15, further comprising SIMD instructions to divide the area light source into the patch of points based on an initial illumination threshold.

* * * * *